United States Patent

Bosch

[15] 3,689,687
[45] Sept. 5, 1972

[54] INSULATOR ARM SUPPORT DEVICE

[72] Inventor: James D. Bosch, 892 East Main, Valley City, N. Dak. 58072

[22] Filed: Sept. 21, 1971

[21] Appl. No.: 182,430

[52] U.S. Cl. ............174/161 R, 174/169, 248/206 A, 248/278
[51] Int. Cl. ............................................H01b 17/14
[58] Field of Search...174/138 R, 158 R, 161 R, 168, 174/169; 24/73 A, 73 AS, 73 MS, 81 AD; 248/206 A, 278; 269/8; 335/285, 286, 287

[56] References Cited

UNITED STATES PATENTS

| 1,688,765 | 10/1928 | Veras | 248/278 X |
| 2,888,617 | 5/1959 | Baumet | 248/206 A X |
| 2,977,082 | 3/1961 | Harris | 248/206 A |
| 2,995,983 | 8/1961 | Davis | 248/206 A X |
| 3,176,602 | 4/1965 | Wilt | 248/278 X |

FOREIGN PATENTS OR APPLICATIONS

| 1,126,224 | 7/1956 | France | 248/206 A |
| 1,204,976 | 8/1959 | France | 248/206 A |
| 215,151 | 5/1924 | Great Britain | 174/158 R |

Primary Examiner—Laramie E. Askin
Attorney—Robert E. Kleve

[57] ABSTRACT

The invention comprises a support device for supporting electrical components such as an electric wire carrying a live charge. The device has an arm member with a telescoping sleeve. The sleeve is made of electrically insulating material. A clip is mounted to the top of the sleeve for grasping and holding the electric wire. A swivel connection is provided at the bottom of the sleeve connecting the sleeve of the arm to a second clip member so as to enable the arm to swivel relative to the second clip member. The second clip member is attached to a magnetized base member and the magnetized member placed on an iron or steel surface.

2 Claims, 2 Drawing Figures

PATENTED SEP 5 1972

3,689,687

INVENTOR
JAMES D. BOSCH

BY *Robert E Kleve*

ATTORNEY

INSULATOR ARM SUPPORT DEVICE

This invention relates to support equipment more particularly, the invention relates to support equipment for supporting electrical wires and the like.

It is an object of the invention to provide a novel inexpensive support device which will support live wires in insulated relation to a main supporting surface and which may be adapted to various different positions.

It is a further object of the invention to provide a novel insulated arm which may be employed to support in insulated relation an electrical component carrying a live charge.

It is another object of the invention to provide a novel supporting stand for supporting several components at one time and which components may be adjusted to different positions on a main supporting surface.

Further objects and advantages of the invention will become apparent as the description proceeds and when taken in conjunction with the accompanying drawing wherein.

Briefly stated, the invention comprises an adjustable arm supporting device having an arm member with a magnetic base member for magnetically attaching the supporting device onto a main supporting magnetically attractable surface, said arm member having a clip member at its upper end for grasping an electrical wire and the like, a telescoping sleeve is mounted to the clip member, and the telescoping sleeve is made of electrical insulating material, a swivel connection is provided at the lower end of the sleeve connecting the arm to a second clip member and enabling said arm to swivel relative to the said second slip member, said second clip member being attached to said magnetic base.

Figure 1:
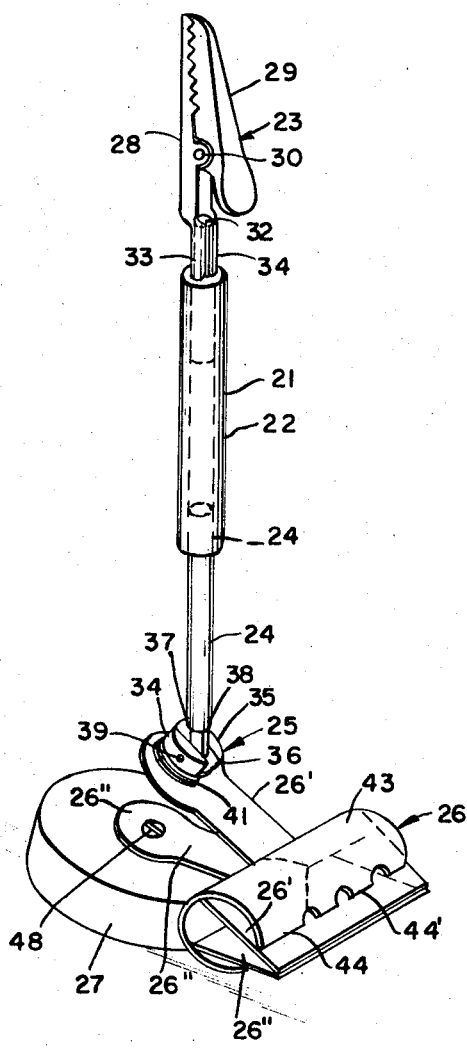
FIG. 1 is a perspective view of the adjustable arm supporting device.
Figure 2:
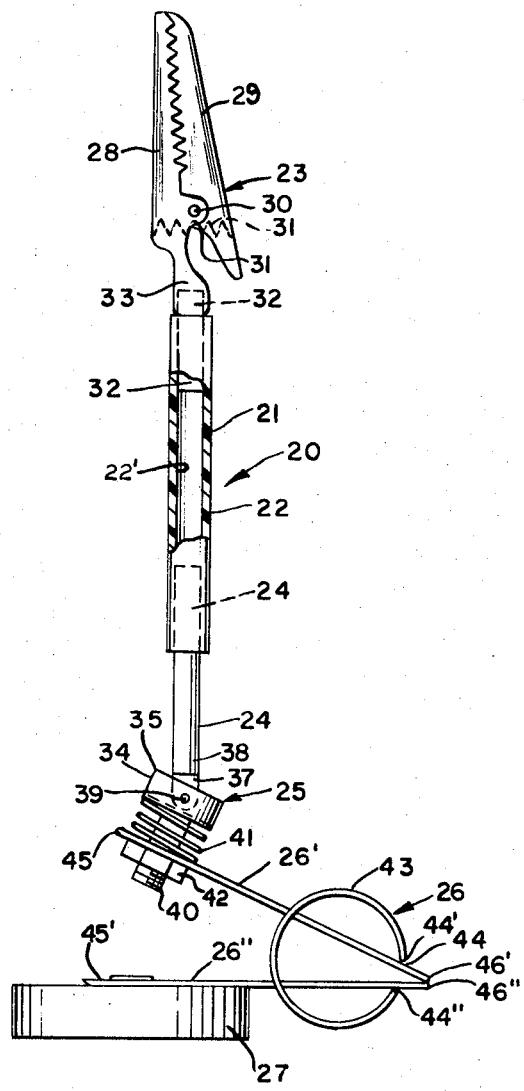
FIG. 2 is a side elevational view partly in sections of the adjustable arm supporting device.

Referring more particularly to the drawing, in FIGS. 1 and 2 a supporting device 20 is illustrated having an arm member 21 which has a telescoping sleeve member 22 with a clip member 23 mounted to the top of the sleeve 22, and a rod member 24 is slidably mounted in the bottom of the sleeve 22. A swivel connection 25 is mounted to the bottom of the rod 24 which connection 25 is connected to leg 26' of a second clip member 26 to provide a swivel connection between the rod 24 and leg 26' of the clip member 26. The other leg 26'' of the clip member 26 is attached to a magnetic base member 27.

The clip member 23 has a fixed jaw member 28 and a movable jaw 29, which moveable jaw 29 pivots about pivot point 30. A coil spring 31 is mounted between the jaws 28 and 29 and urges the jaws 28 and 29 into their closed position as shown in FIGS. 1 and 2. The lower end of the jaw 28 of the clip member 23 has a pair of flanges 33 and 34 which surround and are press-fitted against a metal peg 32 to lock clip member 23 to the peg 32.

The sleeve 22 is made of plastic material and the peg member 32 is fitted into the plastic sleeve 22 and frictionally retained in the sleeve 22.

The rod 24 is made of metal and is slidably mounted in the bore 22' of the sleeve 22. The rod 24 has a sufficiently tight frictional connection with the sleeve 22, when slidably mounted in the sleeve, so that when the sleeve is slid up and down on the rod 24 to a selected position relative to the rod 24, the sleeve will remain in selected or adjusted position.

The swivel connection between the rod 24 and the leg 26' of the clip member has a threaded bolt 34. The bolt 34 has an enlarged head 35 with a slot 36 extending diametrically across the top of the head of the bolt. The rod 24 has a reduced flat plate portion 37 at its lower end which projects downward from the cylindrical portion 38 of the rod 24 and extends diametrically across the bottom of the cylindrical portion 38.

The plate portion 37 of the rod 24 is fitted into the slot 36 in the head of the bolt, and a pin 39 extends through the head of the bolt and through the plate portion 37 to pivotally connect the plate portion 37 of the rod 24 to the head 35 of the bolt, and the plate portion 37 frictionally engages the inner side walls of the head of the bolt in the slot 36 with sufficient friction so that when the rod is pivoted about the pin 39 to an adjusted position relative to the bolt 34 and head 35, the frictional engagement between the plate portion and the head of the bolt will retain the arm 21 in its adjusted selected position.

The stem 40 of the bolt is threaded and passes freely through a bore in the leg 26' of the clip member 26. A coil spring 41 is fitted over the stem 40 between the head 35 and the arm 26'. A threaded nut 42 is threaded onto the stem 40 and tightened sufficiently to compress the spring 41, so that the arm 21, including the rod 24 and bolt 34, may be rotated relative to the leg 26' about the longtitudinal axis of the stem 40 in the bore of the leg 26' to an adjusted position and the coil spring compression of spring 41 will retain the arm 21 in its adjusted position.

Thus the pivotal mounting of the arm 21 by the pin 39 about a horizontal axis and the pivotal mounting of the arm 21 by the rotational mounting of the bolt 34 about the longitudinal axis of its stem, which is perpendicular to the axis of the pin 39, provides a swivel connection between the arm 21 and the leg 26' of the clip member 26.

The clip member 26 is of a conventional type having a cylindrical spring metal sleeve 43 with a longitudinal slot 44 along one side forming edges 44' and 44'' of the spring sleeve. The pair of leg members 26' and 26'' form the legs of the clip member, and the sleeve spring 43 surrounds the portions of the leg members 26' and 26'' so that by pressing the outer ends 45 and 45' of leg members 26' and 26'' toward one another, this forces the edges 44' and 44'' of the spring sleeve apart, causing the opposing ends 46' and 46'' of the legs 26' and 26'' to move apart so that material may be placed between the ends 46' and 46''. The ends 45 and 45' may be released and the sleeve 43 will cause the ends 46' and 46'' to come back together again to retain material therebetween.

The other leg 26'' of the clip member 26 is rigidly mounted to the magnetic base member 27 by a screw 48. The base member 27 has been magnetized to serve as a magnet to hold the arm device in an adjusted position on a steel or iron surface.

It is intended that the arm support device 20 be employed to hold electrical wires having a live charge, while the operator is repairing or servicing electrical equipment. The live electrical wire will be held between the jaws 28 and 29 of the clip member 23, and the plastic sleeve 22 of the arm provides an electric insulation to electrically insulate jaws 28 and 29 of the clip member 23 from the rod 24, the swivel connection 25, clip member 26, base member 27, and the supporting surface.

Although the base member 27 is magnetically attractable, it will have sufficient weight to support the arm member 21 upright or in adjusted positions on other types of supporting surfaces.

The alligator clip member 23 may be used to hold parts to be assembled while glueing, soldering, etc.; and the metal jaws also act as a heat sink while soldering electrical components.

The device may be used with live circuits because the plastic insulating sleeve 22 insulates the clip member 23 from the rest of the device and may be also used for holding various electrical components.

The second clip member 26 may be used to hold various components or materials. The second clip member 26 may also be used to attach the supporting device 20 to the edge of non-ferrous materials.

Thus it will be seen that a novel servicing or holding device has been provided, which will hold live wires of electrical circuits and the pivotal movement about different axes of the arm 21 enables the arm to be adjusted to a variety of different positions to assist in the servicing work.

It will be obvious that various changes and departures may be made to the invention without departing from the spirit thereof, and accordingly, it is not intended that the invention be limited to that specifically described in the specification or as illustrated in the drawing, but only as set forth in the appended claims wherein:

What is claimed is:

1. A support device for holding live electrical components, such as live electrical wire while servicing an electrical circuit, said support device comprising an arm, said arm having a telescoping sleeve made of electrically insulating material, a clip member at the top of the telescoping sleeve for holding said electrical wire, a swivel connection at the bottom of the sleeve for pivoting the sleeve and clip member about two axes perpendicular to another, a magnetic base member, and means connecting said magnetic base member to said swivel connection.

2. A support device according to claim 1 wherein said means connecting said magnetic base member to said swivel connection comprises a second clip member.

* * * * *